(12) United States Patent
Silverbrook et al.

(10) Patent No.: US 7,083,254 B2
(45) Date of Patent: *Aug. 1, 2006

(54) CAPPING DEVICE FOR A PRINTER

(76) Inventors: Kia Silverbrook, 393 Darling Street, Balmain, NSW (AU) 2041; Simon Robert Walmsley, 393 Darling Street, Balmain, NSW (AU) 2041

( * ) Notice: Subject to any disclaimer, the term of this patent is extended or adjusted under 35 U.S.C. 154(b) by 328 days.

This patent is subject to a terminal disclaimer.

(21) Appl. No.: 10/636,250

(22) Filed: Aug. 8, 2003

(65) Prior Publication Data

US 2004/0075711 A1    Apr. 22, 2004

Related U.S. Application Data

(62) Division of application No. 09/575,182, filed on May 23, 2000, now Pat. No. 6,924,907.

(30) Foreign Application Priority Data

May 25, 1999    (AU) .................................... PQ0560

(51) Int. Cl.
    *B41J 2/165*    (2006.01)
(52) U.S. Cl. ......................................... 347/29; 347/32
(58) Field of Classification Search ............. 347/22–35
    See application file for complete search history.

(56) References Cited

U.S. PATENT DOCUMENTS

| 4,372,695 A | 2/1983 | Ross |
| 4,904,100 A | 2/1990 | Enix |
| 5,028,934 A | 7/1991 | Kasai et al. |
| 5,192,959 A | 3/1993 | Drake |
| 5,440,332 A | 8/1995 | Good |
| 5,503,483 A | 4/1996 | Petteruti et al. |
| 5,593,236 A | 1/1997 | Bobry |
| 5,644,663 A | 7/1997 | Saito et al. |
| 5,706,101 A | 1/1998 | Yokoyama et al. |
| 5,895,905 A | 4/1999 | McVicar |
| 5,953,497 A | 9/1999 | Kokubo et al. |
| 5,959,290 A | 9/1999 | Schweid et al. |
| 6,069,711 A | 5/2000 | Iwata |
| 6,089,693 A | 7/2000 | Drake et al. |
| 6,229,565 B1 | 5/2001 | Bobry |
| 6,285,469 B1 | 9/2001 | Tuli |
| 6,416,160 B1 * | 7/2002 | Silverbrook .................. 347/32 |
| 6,561,618 B1 * | 5/2003 | Simmons et al. .............. 347/32 |

FOREIGN PATENT DOCUMENTS

| EP | 0763430 A | 3/1997 |
| JP | 06106818 A | 4/1994 |
| JP | 10264479 A | 10/1998 |
| WO | WO 87/06532 A | 11/1987 |
| WO | WO 1999/29100 A | 6/1999 |

* cited by examiner

*Primary Examiner*—Shih-Wen Hsieh

(57) ABSTRACT

A capping device 19 for a printer movable between an open position, in which the printhead 16 may deposit ink on print media, and a closed position, in which the capping device 19 blocks the printhead 16 from depositing ink on said media, the capping device being operatively connected to at least one media feed roller 18*a* whereby motion of said feed roller 18*a* moves the capping device 19 between the open and closed position.

14 Claims, 12 Drawing Sheets

CAPPING DEVICE FOR A PRINTER

The present application is a divisional of U.S. application Ser. No. 09/575,182 filed on May 23, 2000, now issued as U.S. Pat. No. 6,924,907, all of which is herein incorporated by reference.

FIELD OF THE INVENTION

The invention relates to a compact printer system able to print full-color, business card size documents from a device about the size of a pen. The system includes various hot-connectable modules that provide a range of functions. In particular the invention relates to a compact color printer that provides a print function for the compact printer system.

Reference may be had to co-pending applications claiming priority from Australian Provisional Patent Application number PQ0560 dated May 25, 1999. The co-pending applications describe related modules and methods for implementing the compact printer system. The co-pending applications are as follows:

| USSN | Docket No. | Title |
| --- | --- | --- |
| 09/575,173 | PP02 | Modular Compact Printer System |
| 09/575,194 | PP03 | Nozzle Capping Mechanism |
| 09/575,136 | PP04 | Ink Cartridge for Compact Printer System |
| 09/575,119 | PP07 | Controller for Printer Module |
| 09/575,135 | PP08 | Camera Module for Compact Printer System |
| 09/575,157 | PP09 | Image Processor for Camera Module |
| 09/575,166 | PP10 | Memory Module for Compact Printer System |
| 09/575,134 | PP11 | Effects Module for Compact Printer System |
| 09/575,121 | PP12 | Effects Processor for Effects Module |
| 09/575,137 | PP13 | Timer Module for Compact Printer System |
| 09/575,167 | PP15 | Color Conversion Method for Compact Printer System |
| 09/575,120 | PP16 | Method and Apparatus of Dithering |
| 09/575,122 | PP17 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Docket No. | Title |
| --- | --- | --- |
| 09/575,152 | MJ62 | Fluidic seal for an ink jet nozzle assembly |
| 09/575,141 | IJ52 | Ink jet printhead having a moving nozzle with an externally arranged actuator |
| 09/575,125 | IJM52 | Method of manufacture of an ink jet printhead having a moving nozzle with an externally arranged actuator |
| 09/575,176 | MJ63 | Ink jet printhead nozzle array |
| 09/575,147 | MJ58 | Nozzle guard for an ink jet printhead |

SUMMARY OF THE INVENTION

In one form, the invention resides in a printer module for a compact printer system comprising:

an elongate body;

a stationary printhead housed within said body, means for moving a printable media past said stationary printhead;

an ink reservoir within said body and communicating with said printhead;

means within said body for storing an image to be printed by said printhead; and means for transferring said image to said printhead;

said printhead printing said image on substantially the full width of said printable media in a single pass.

According to an embodiment of the present invention there is provided a capping device for a printer having a printhead and at least one media feed roller, said capping device movable between an open position, in which the printhead may deposit ink on print media, and a closed position, in which the capping device blocks the printhead from depositiong ink on said media, said capping device being operatively connected to the at least one media feed roller whereby motion of said feed roller moves the capping device between said open and closed position.

Preferably, the capping device is connected to the at least one roller via a clutch. Preferably, the clutch is a friction clutch.

Further features of the invention will be evident from the following description.

BRIEF DESCRIPTION OF THE DRAWINGS

In order to assist with describing preferred embodiments of the invention, reference will be made to the following figures in which.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
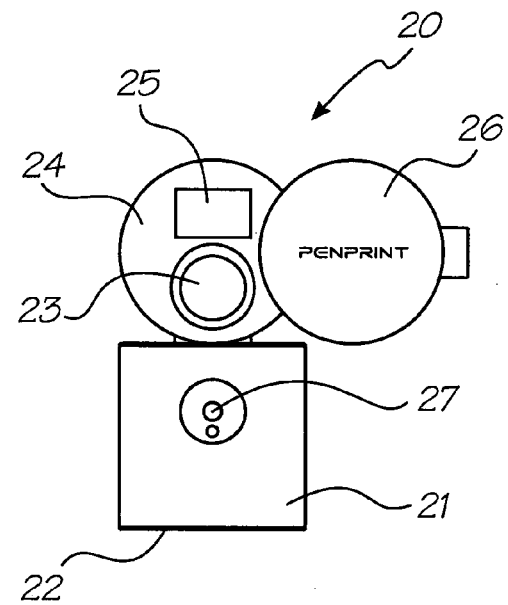
FIG. 2 is a camera module.
Figure 3:
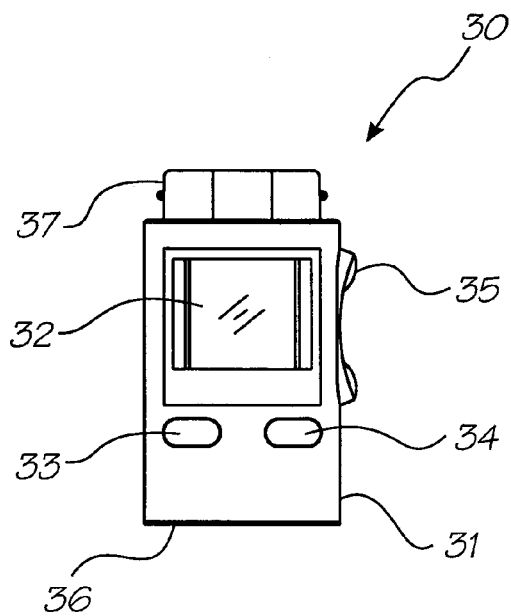
FIG. 3 is a memory module.
Figure 6:
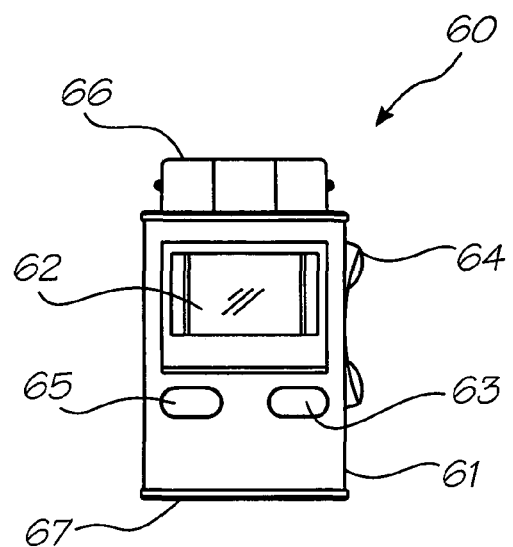
FIG. 6 is a timer module.
Figure 7:
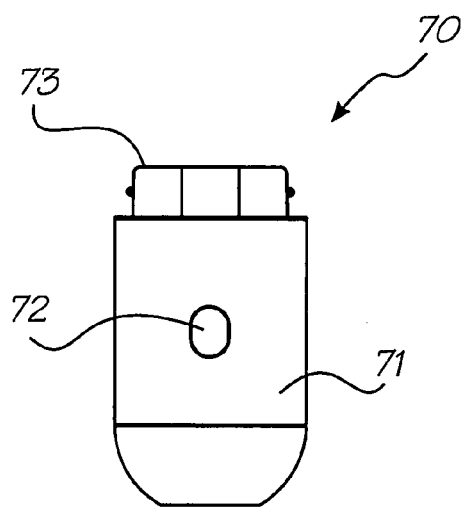
FIG. 7 is a laser module.

Compact printer modules can be grouped into three types:
  image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
  housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
  isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
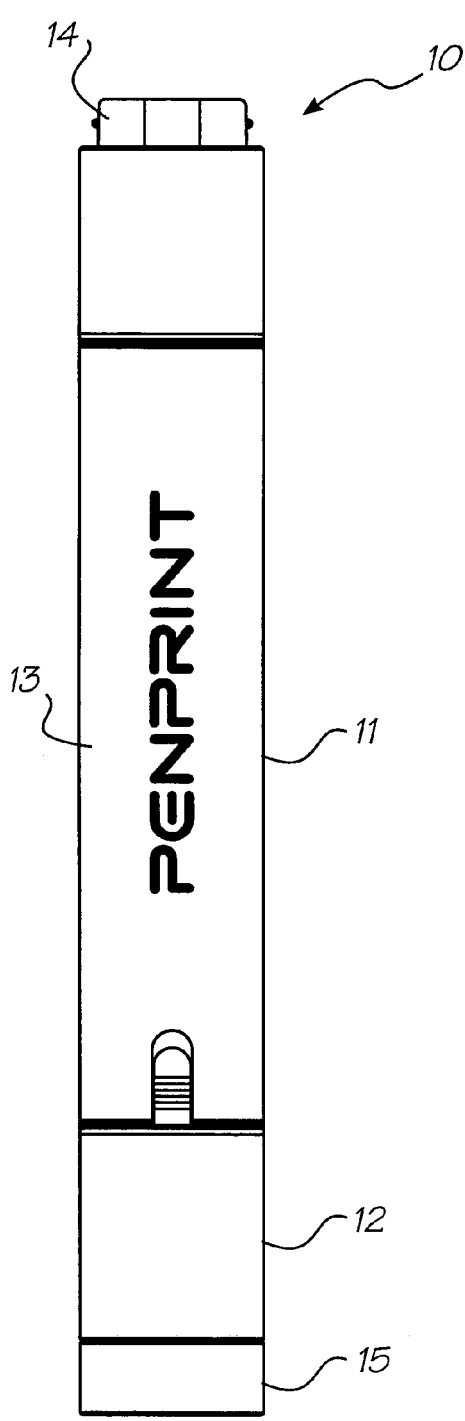
FIG. 1 is a printer module.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

Figure 4:
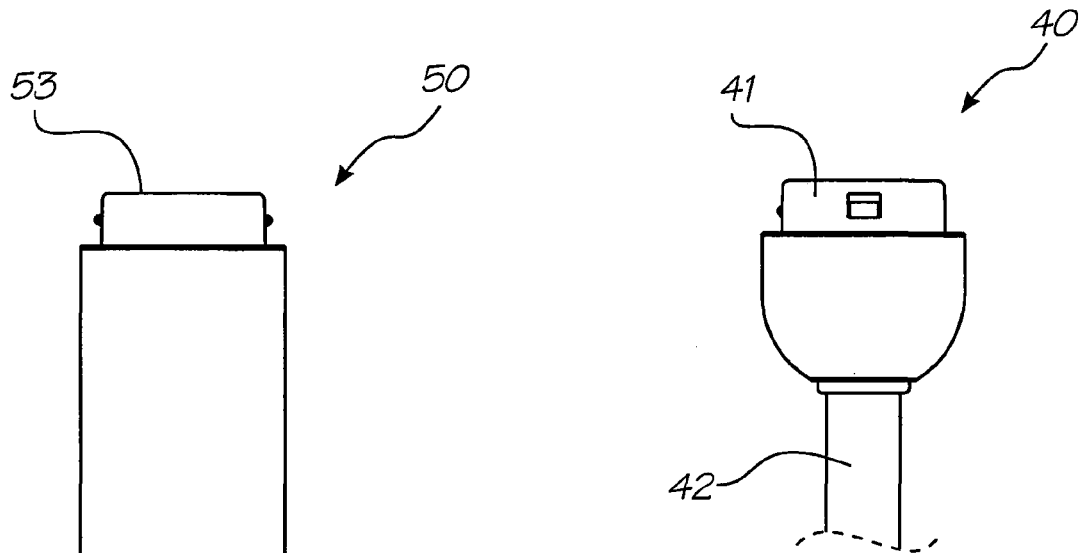
FIG. 4 is a communication module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

Figure 5:
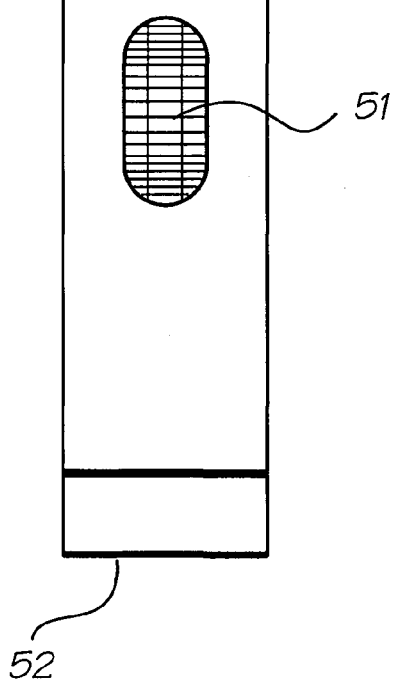
FIG. 5 is a flash module.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
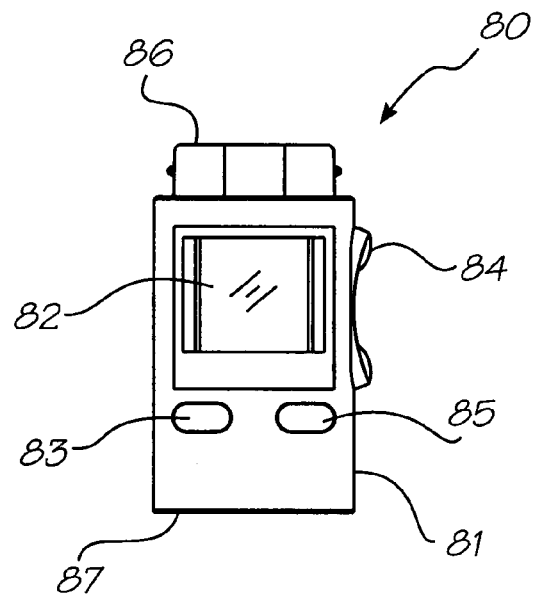
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
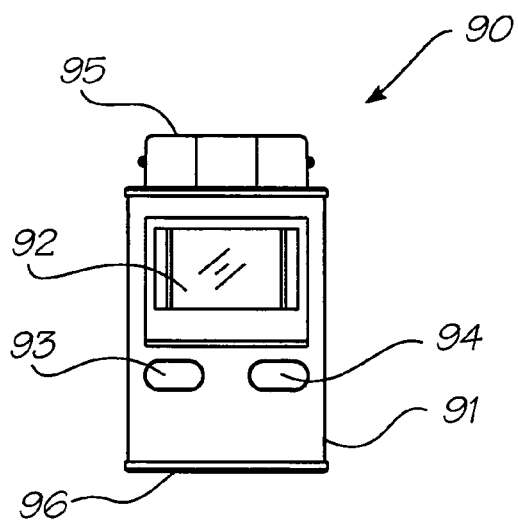
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
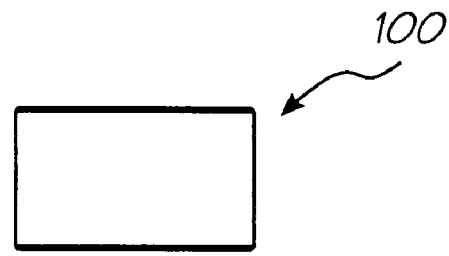
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
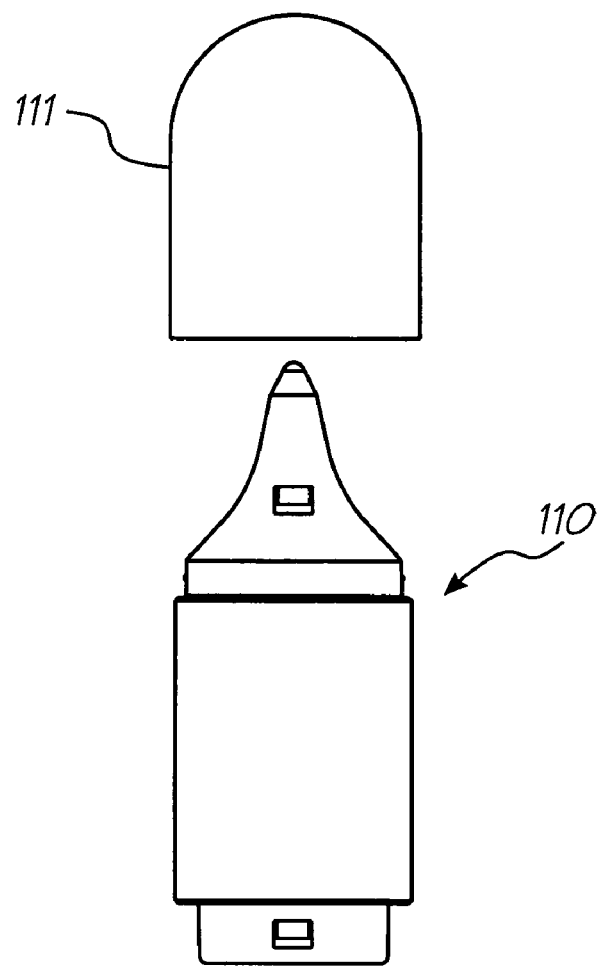
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
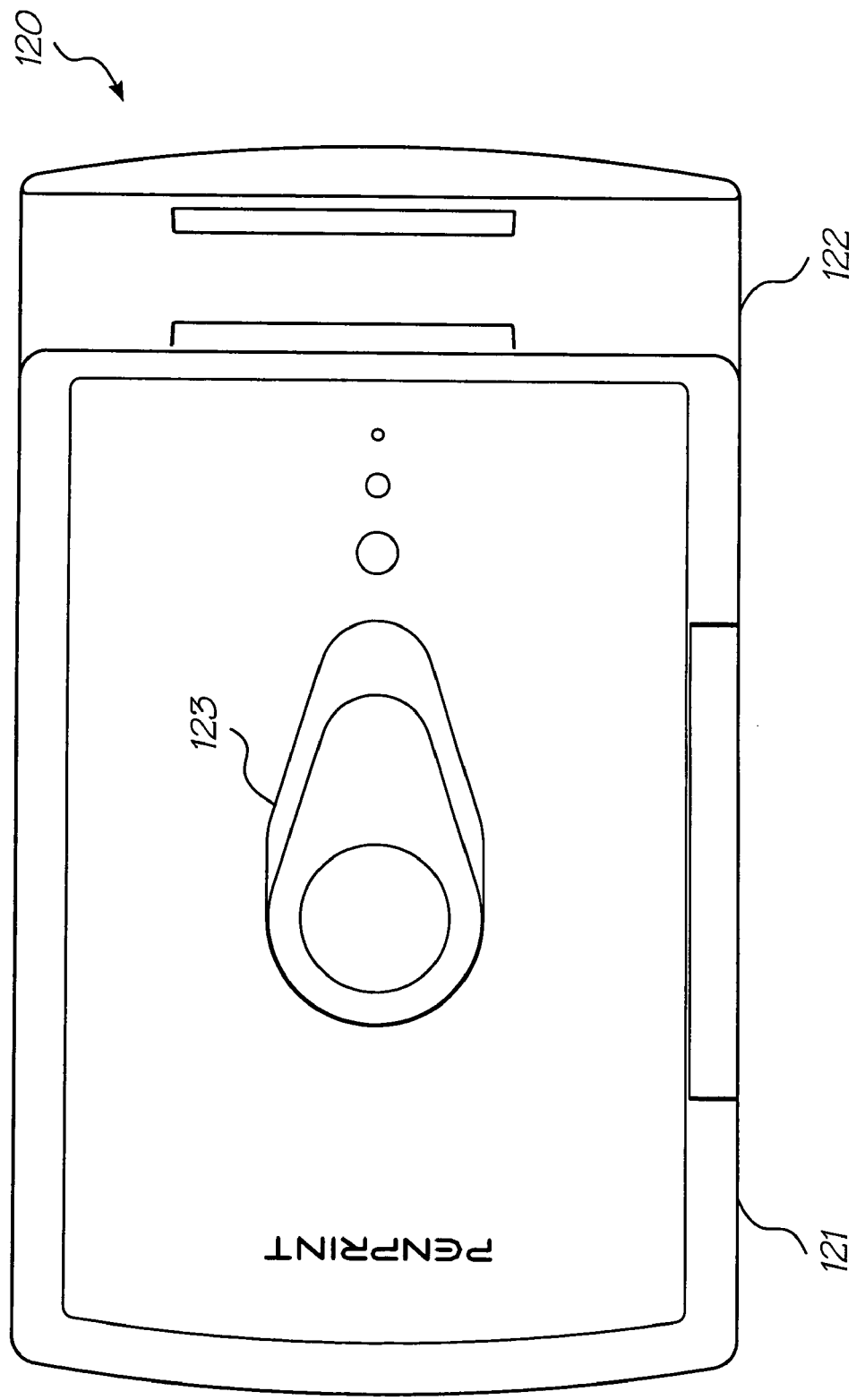
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
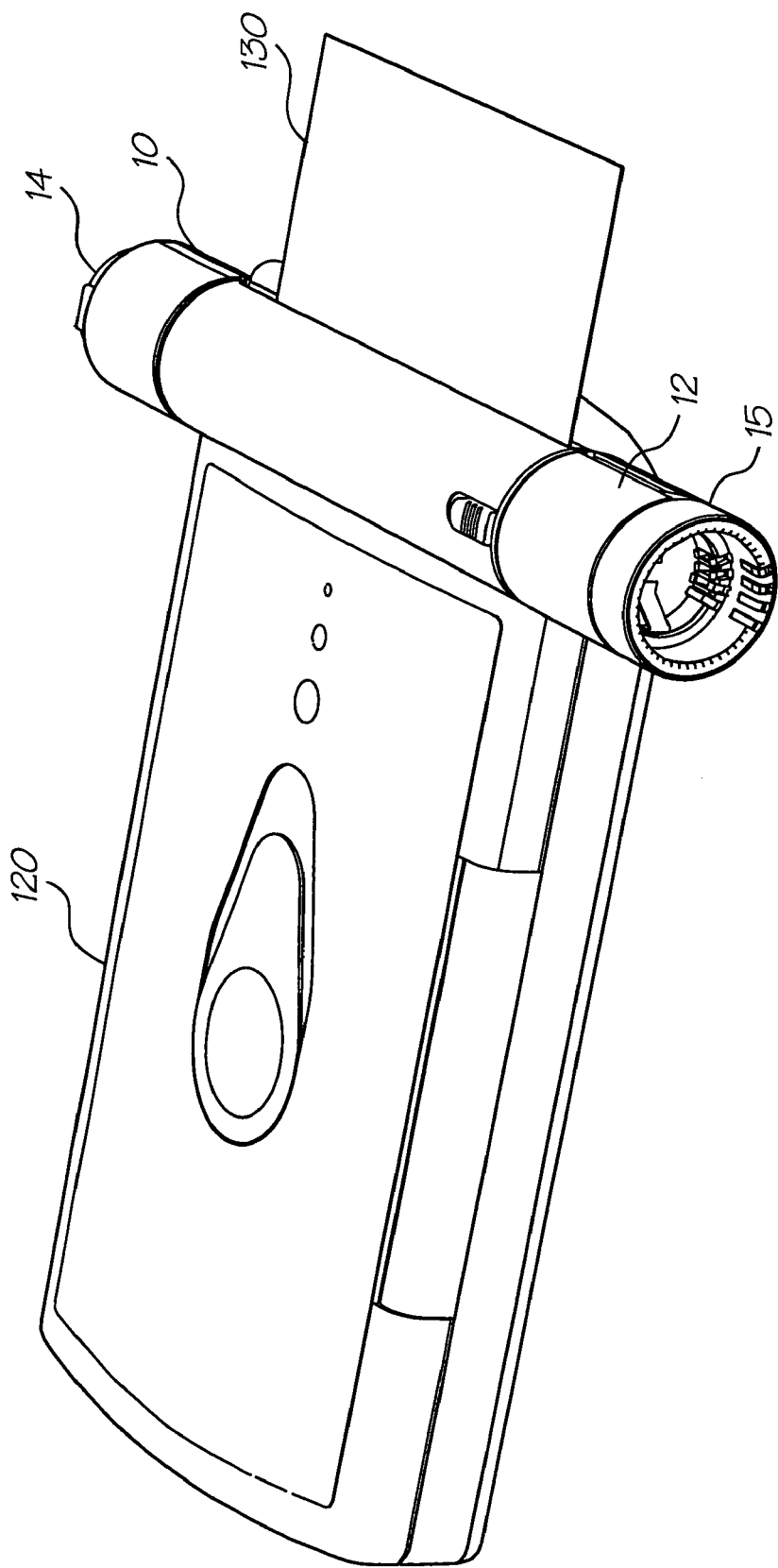
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
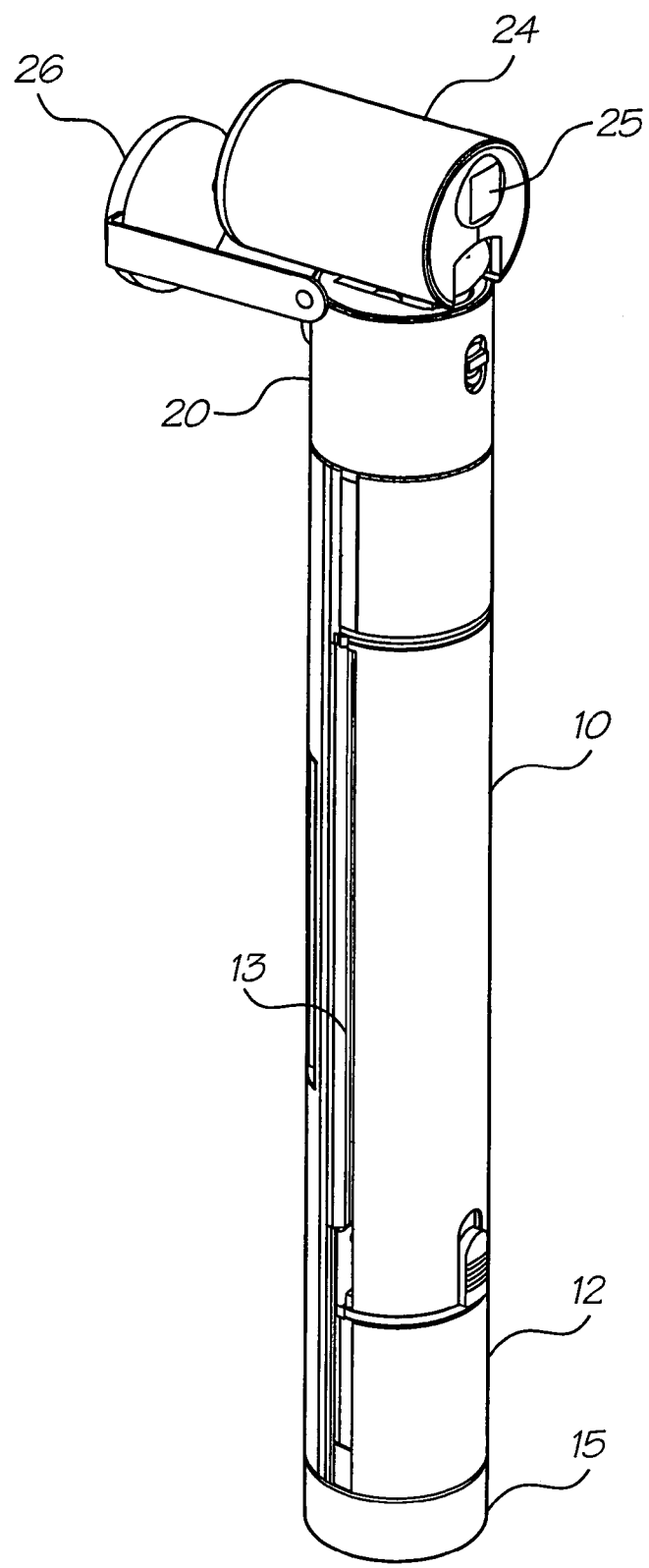
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
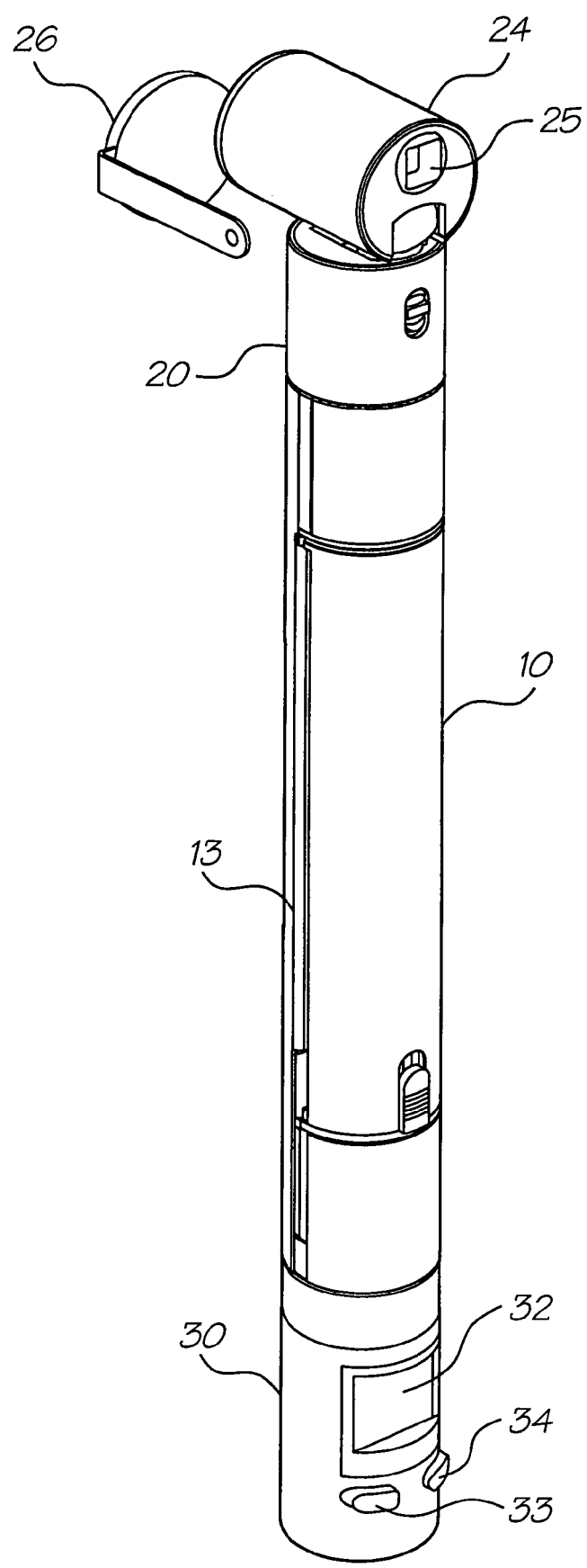
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
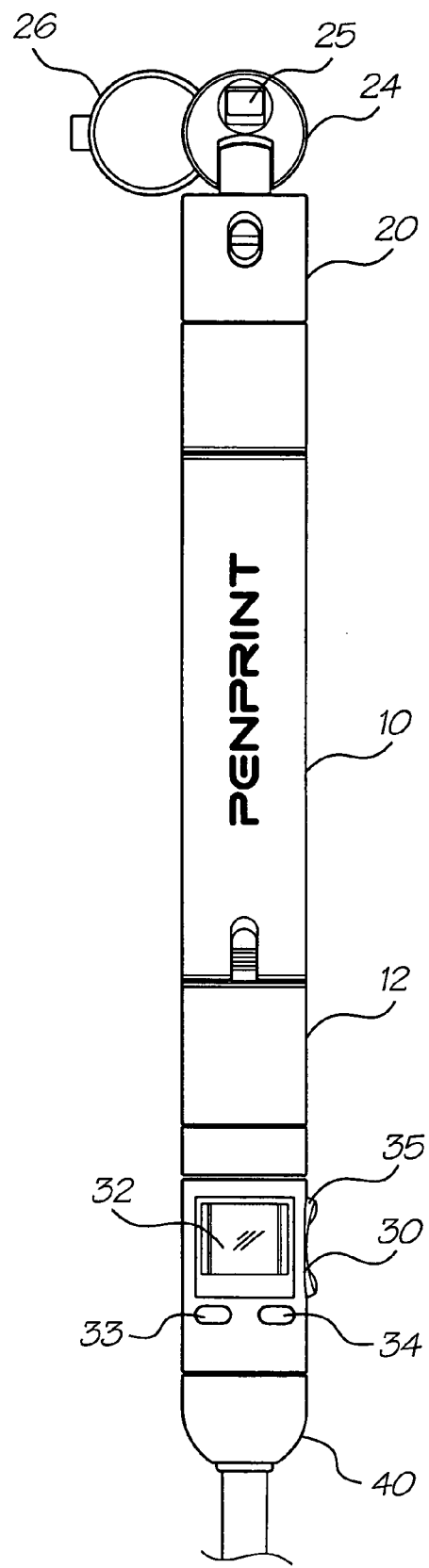
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
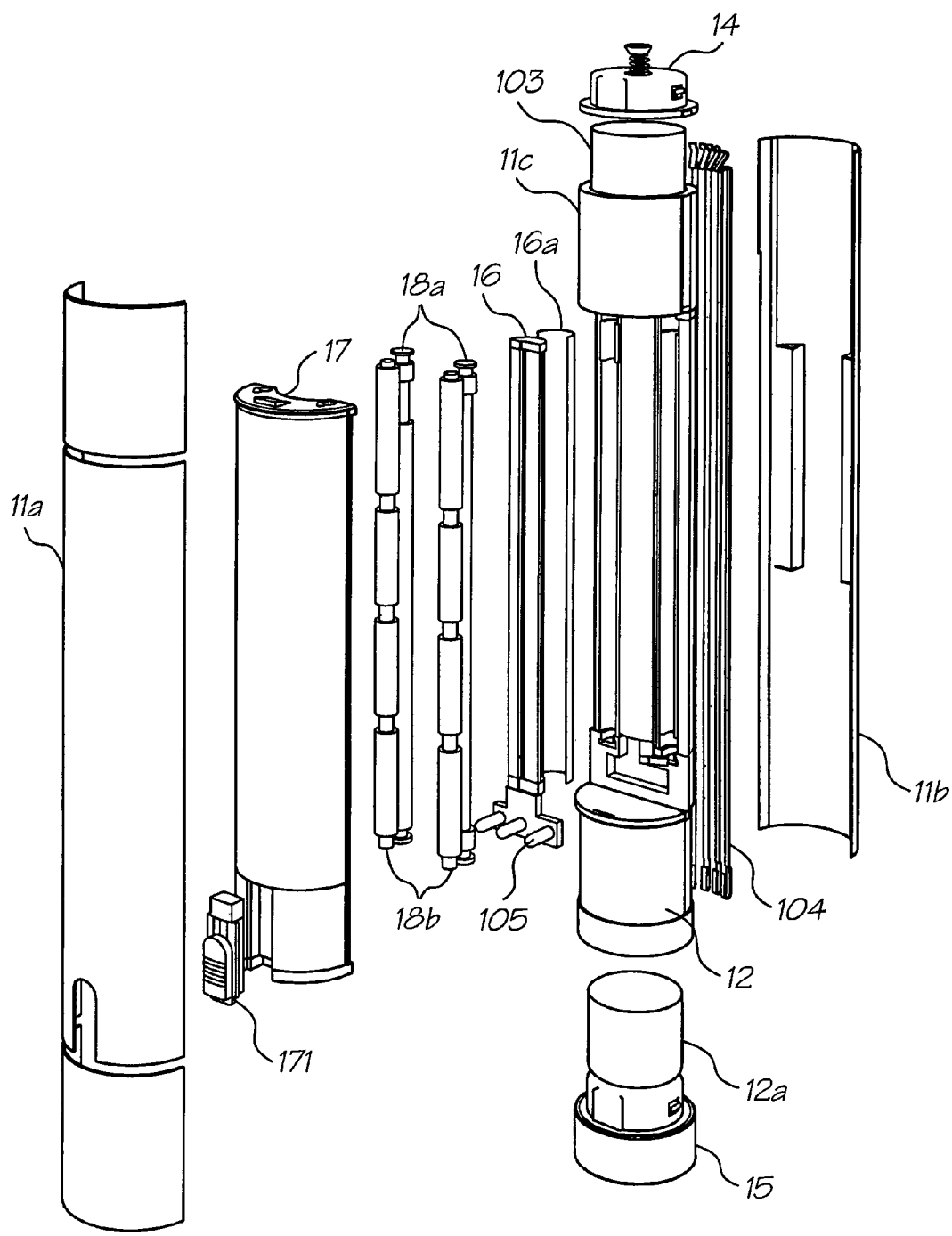
FIG. 17 is an exploded view of the Printer Module of FIG. 1.
Figure 18:
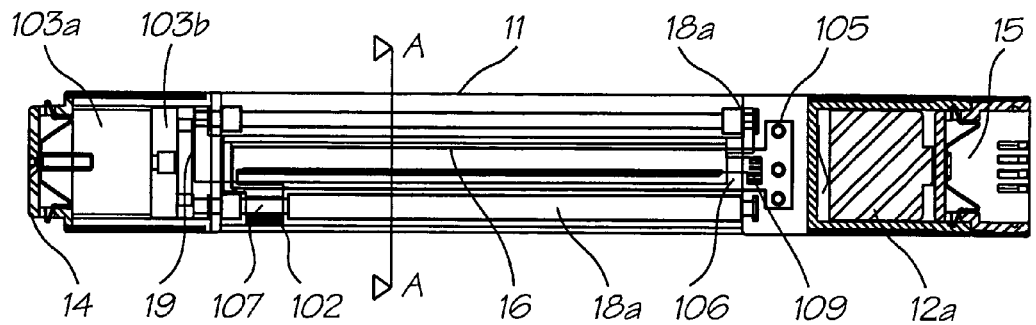
FIG. 18 is a top view of the Printer Module with ink cartridge removed.
Figure 19:
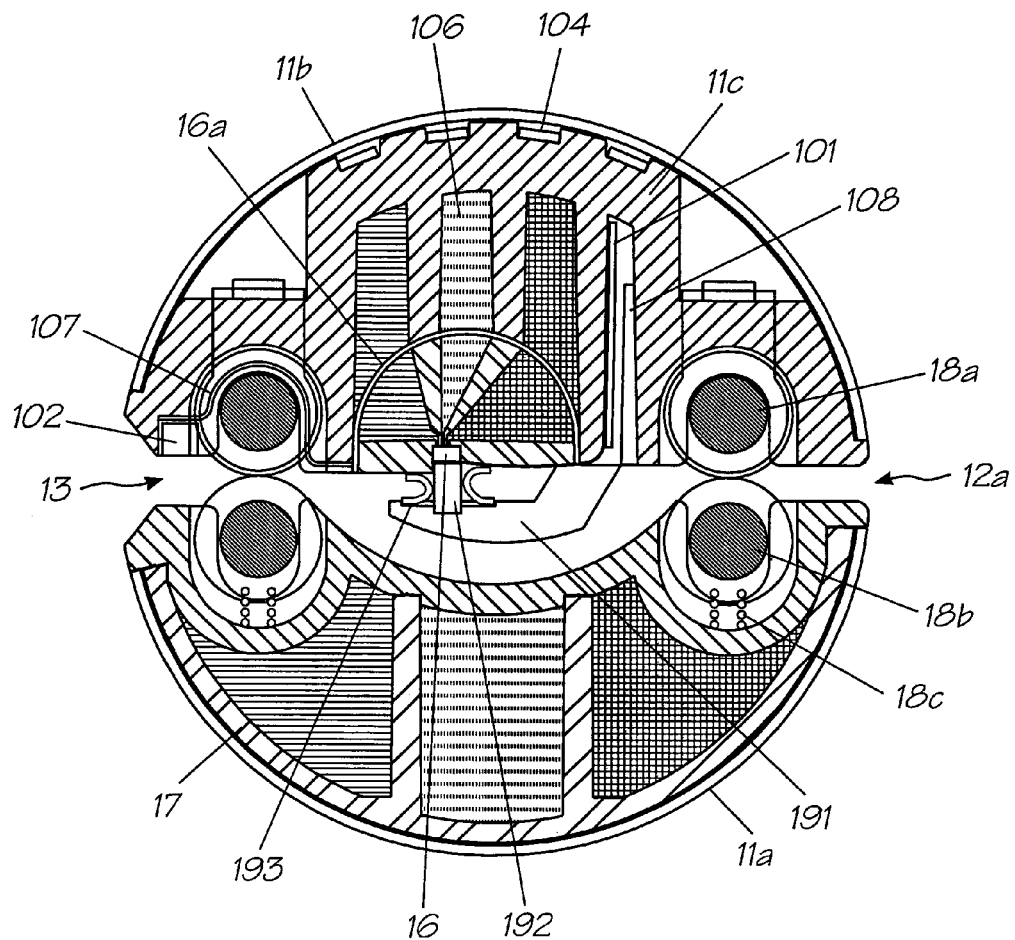
FIG. 19 is a cross-sectional view through AA in FIG. 18.

Detailed views of the Printer Module 10 are shown in FIGS. 17, 18 and 19. The Printer Module 10 is the central module in the compact printer system. It contains a 2-inch Memjet printhead 16, a Cyan/Magenta/Yellow ink cartridge 17, the current image stored in flash memory on the printhead, and a power source in the form of a 3V battery 12a in the battery compartment 12. With regards to processing, the Printer Module 10 contains a controller chip (or chips) 101 that controls printing of the stored image in high quality.

The Printer Module 10 can be used as a stand-alone printer of a single image (such as business cards), or can be used in conjunction with other modules to print a variety of images.

Looking in detail at FIG. 17, the body 11 of the printer module is in three parts being a lid 11a, base 11b and chassis 11c. Printhead 16 with filter 16a fits into the chassis 11c. Powered rollers 18a are driven by motor and gearbox 103. Neutral rollers 18b fit into ink cartridge 17 and guide a card past the printhead 16. Springs 18c (FIG. 19) urge the neutral rollers 18b towards the powered rollers 18a. The ink cartridge 17 is located beyond the rollers 18 so that the card passes between the printhead 16 and the ink cartridge 17. Ink inlets 105 provide communication between the ink cartridge 17 and the printhead 16. Micro-moulded channels 106 in the chassis 11c distribute the ink from the ink inlets 105 to the length of the printhead 16.

Serial bus 104 provides power and data between the printer module 10 and other modules connected to male connector 14 and female connector 15. The serial bus 104 picks up power from the battery 12a and signals from the controller 101.

Looking at FIG. 19, to print an image, a user simply inserts a business card into the input slot 13 of the Printer Module. Sensor 102 detects the insertion and a small motor 103a and gearbox 103b activates rollers 18 to carry the card through the module. A tab film 107 provides signal connection from the sensor 102 to the controller 101 and hence to the motor and gearbox 103. A wedge 108 holds the tab film 107 in place to make a signal connection.

The printed card is ejected from the output slot 13a of the module over a time period of 1 second. There is no on/off switch—the act of inserting the card is the effective "on" switch for the duration of a print.

To reduce the chance of ink drying in the printhead 16 a capping mechanism 19 is provided to cap the ink nozzles in the printhead. The capping mechanism 19 comprises a capping arm 191 supporting a blotter 192 with adjacent elastomeric seals 193. A clutch 194 is operatively associated with one of the powered rollers 18a to move the capping arm 191 out of the path of the card for printing.

The volume of ink present in an ink cartridge is 450 ml (2 mm×3 mm×75 mm), enough to produce 450 million dots of a given color. The exact number of images that can be printed before replacement will depend on the color composition of those images. 450 ml represents:
25 full black cards (black requires all three colors to be used)
50 full sized photos at 50% CMY coverage
111 typical photo/text cards at 22.5% CMY coverage
166 cards of black (CMY) text at 15% coverage A QA chip in the ink cartridge keeps track of how much ink has been used. Sensors in the ink cartridge provide signals to the QA chip that are transferred to the controller 101 via contacts 109. If there is insufficient ink of any color to print a given image, the card will pass through the printer module, but nothing will be printed.

It is a simple matter to replace the old ink cartridge 17 by sliding latch 171, removing lid 11a, unclipping the old cartridge and clipping on a new one.

Figure 20:
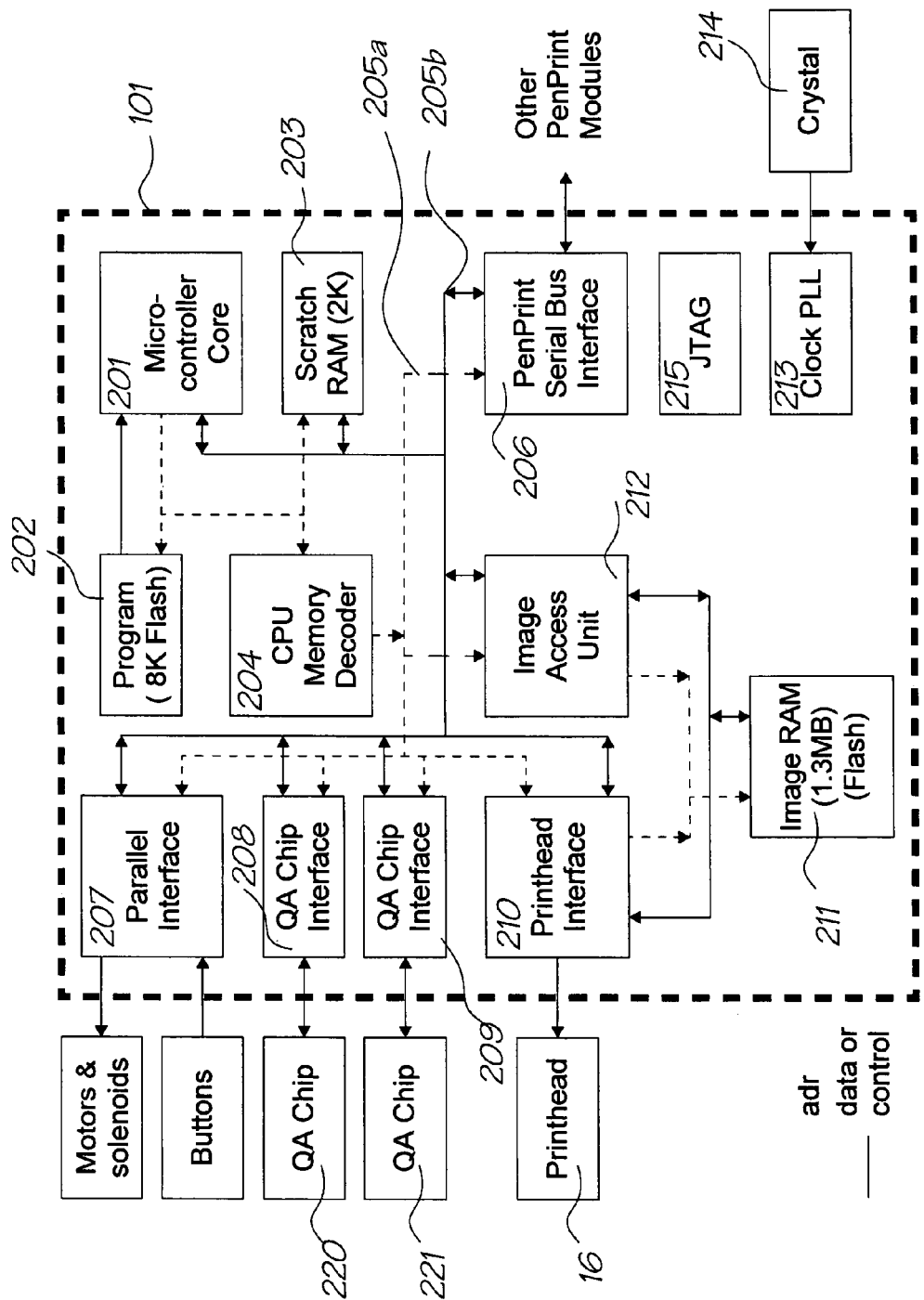
FIG. 20 is a block circuit diagram of a controller for the printer module.

A schematic of a suitable controller 101 is shown in FIG. 20. The controller may be embodied in a single application specific integrated circuit or in a number of discrete elements. The controller 101 includes a simple micro-controller CPU core 201 with associated program ROM 202 and program RAM 203. The CPU 201 communicates with the other units within the controller via memory-mapped I/O supported by a Memory Decoder 204. The Decoder 204 translates data addresses into internal controller register accesses over the internal low speed bus 205, and therefore allows for memory mapped I/O of controller registers. The bus 205 includes address lines 205a and data or control lines 205b.

An optional Serial Bus interface 206, is connected to the internal chip low-speed bus 205 and connects to the Serial Bus for communication with other modules. A parallel interface 207 provides communication to the motor and gearbox 103 in the printer module 10. It can also receive signals from buttons, such as a paper sensor 102.

There are two optional low-speed serial interfaces 208, 209 connected to the internal low-speed bus 205. A first interface 208 connects to the QA chip 220 in the ink cartridge of the printer module 10. The second interface connects to a QA chip 221 on the print module 10. The reason for having two interfaces is to connect to both the on-module QA Chip 221 and to the ink cartridge QA Chip 220 using separate lines to improve security. If only a single line is used, a clone ink cartridge manufacturer could usurp the authentication mechanism and provide a non-proprietary cartridge.

The total amount of memory required for the interleaved linear CMY/L*a*b* image is 1,361,700 bytes (approximately 1.3 MB). The image is written to Image Storage Memory 211 by the Image Access Unit 212, and read by both the Image Access Unit 212 and the Printhead Interface (PHI) 210. The CPU does not have direct random access to this image memory. It must access the image pixels via the Image Access Unit 212. The Printhead Interface 210 is the means by which the controller loads the printhead 16 with the dots to be printed, and controls the actual dot printing process.

The controller 101 may also include a clock phase-locked loop 213 that provides timing signals to the controller. The clock 213 draws a base signal from crystal oscillator 214. Some CPU include a clock so the clock and crystal would not be required.

A standard JTAG (Joint Test Action Group) Interface 215 is included in the controller for testing purposes. Due to the complexity of the controller, a variety of testing techniques are required, including BIST (Built In Self Test) and functional block isolation. An overhead of 10% in chip area is assumed for overall chip testing circuitry.

The battery used to power the compact printer system is a CR1/3N cell. The battery contains enough power to print 133 photos. The characteristics of the battery are listed in the following table.

| Parameter | Value |
| --- | --- |
| Type Designation | CR1/3N |
| Voltage (V) | 3 |
| Electrochemical System | Lithium |
| Typical Capacity (mAh) | 170 |
| Height (mm) | 10.80 |
| Diameter (mm) | 11.60 |
| Weight (g) | 3.00 |

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A capping device for a printer having a fixed/pagewidth printhead and at least one media feed roller, said capping device movable between an open position, in which the printhead may deposit ink on print media, and a closed position, in which the capping device blocks the printhead from depositing ink on said media, said capping device being operatively connected to the at least one media feed roller whereby motion of said feed roller moves the capping device between said open and closed position.

2. The capping device of claim 1 wherein said device is connected to said at least one roller via a clutch.

3. The capping device of claim 2 wherein said clutch is a friction clutch.

4. The capping device of claim 1 wherein said at least one roller is mounted for rotation about an axis of rotation and when rotated about said axis to draw said media past the printhead, the capping device is caused to move from the closed position to the open position.

5. The capping device of claim 4 wherein said at least one roller is a powered roller adjacent one or more neutral rollers.

6. The capping device of claim 1 wherein said capping device includes an arm for supporting a blotter having at least one adjacent elastomeric seal for capping a plurality of ink nozzles in said printhead.

7. The capping device of claim 1 wherein the printhead is a monolithic drop-on-demand inkjet printer.

8. A printer including:
   a fixed/pagewidth printhead;
   a capping device;
   at least one media feed roller;
   said capping device movable between an open position, in which the printhead may deposit ink on print media, and a closed position, in which the capping device blocks the printhead from depositing ink on said media, said capping device being operatively connected to the at least one media feed roller whereby motion of said feed roller moves the capping device between said open and closed position.

9. The printer of claim 8 wherein said capping device is connected to said at least one roller via a clutch.

10. The printer of claim 9 wherein said clutch is a friction clutch.

11. The printer of claim 8 wherein said at least one roller is mounted for rotation about an axis of rotation and when rotated about said axis to draw said media past the printhead, the capping device is caused to move from the closed position to the open position.

12. The printer of claim 11 wherein said at least one roller is a powered roller adjacent one or more neutral rollers.

13. The printer of claim 8 wherein said capping device includes an arm for supporting a blotter having at least one adjacent elastomeric seal for capping a plurality of ink nozzles in said printhead.

14. The printer of claim 8 wherein the printhead is a monolithic drop-on-demand inkjet printer.

\* \* \* \* \*

UNITED STATES PATENT AND TRADEMARK OFFICE
CERTIFICATE OF CORRECTION

PATENT NO. : 7,083,254 B2  Page 1 of 1
APPLICATION NO. : 10/636250
DATED : August 1, 2006
INVENTOR(S) : Kia Silverbrook and Simon Robert Walmsley It is certified that error appears in the above-identified patent and that said Letters Patent is hereby corrected as shown below:

Title Page; please insert;

-- (73)   Assignee:   Silverbrook Research Pty Ltd,
                      Balmain (AU) --

Signed and Sealed this

Twenty-third Day of September, 2008

JON W. DUDAS
*Director of the United States Patent and Trademark Office*